United States Patent [19]
Usui

[11] Patent Number: 5,887,910
[45] Date of Patent: Mar. 30, 1999

[54] CONNECTION STRUCTURE FOR BRANCHING CONNECTOR IN HIGH-PRESSURE FUEL RAIL

[75] Inventor: Masayoshi Usui, Numazu, Japan

[73] Assignee: Usui Kokusai Sangyo Kaisha Limited, Japan

[21] Appl. No.: 693,082
[22] PCT Filed: Dec. 8, 1995
[86] PCT No.: PCT/JP95/02517
  § 371 Date: Oct. 4, 1996
  § 102(e) Date: Oct. 4, 1996
[87] PCT Pub. No.: WO96/18062
  PCT Pub. Date: Jun. 13, 1996

[30] Foreign Application Priority Data

Dec. 8, 1994 [JP] Japan ................................. 6-331086

[51] Int. Cl.$^6$ .................................................. F16L 13/02
[52] U.S. Cl. ...................... 285/288.1; 285/328; 285/906
[58] Field of Search ................................. 285/288.1, 189, 285/330, 328, 332, 906

[56] References Cited

U.S. PATENT DOCUMENTS

| | | | |
|---|---|---|---|
| 2,183,043 | 12/1939 | Kerr | 285/288.1 X |
| 2,257,427 | 9/1941 | Parker | 285/288.1 X |
| 2,463,006 | 3/1949 | Vander Clute | 285/288.1 X |
| 3,439,941 | 4/1969 | Nicol | 285/288.1 X |
| 3,848,421 | 11/1974 | O'Brien et al. | 285/332 X |
| 3,912,306 | 10/1975 | McCormick | 285/332 X |
| 4,832,376 | 5/1989 | Sugao | |
| 4,893,601 | 1/1990 | Sugao | |
| 4,900,180 | 2/1990 | Takikawa | |
| 5,120,084 | 6/1992 | Hashimoto | |
| 5,143,410 | 9/1992 | Takikawa | |
| 5,169,182 | 12/1992 | Hashimoto | |
| 5,172,939 | 12/1992 | Takikawa | |

FOREIGN PATENT DOCUMENTS 2-80289 of 1990 Japan.
3-177693 of 1991 Japan.
4-175462 of 1992 Japan.

*Primary Examiner*—Dave W. Arola
*Attorney, Agent, or Firm*—Anthony J. Casella; Gerald E. Hespos; Ludomir A. Budzyn

[57] ABSTRACT

A main tube provided with a channel is mounted in a fuel rail and has a peripheral wall. One or more holes extend vertically through the peripheral wall and are in communication with the channel. Each hole forms a dished seat portion having either a staircase-like cross section or an inclined surface. The enlarged portion is formed near one end of the branching connector and extends to the inclined wall toward the front end. A connection head portion is formed at the front end of the enlarged portion. The connection head portion totally conforms in cross-sectional shape with the seat portion. The head portion is brought into abutting engagement with the seat portion. The engaging portions of the abutting portions are brazed and connected together.

16 Claims, 6 Drawing Sheets

PRIOR ART

CONNECTION STRUCTURE FOR BRANCHING CONNECTOR IN HIGH-PRESSURE FUEL RAIL

TECHNICAL FIELD

The present invention relates to a connection structure for a connector such as a branch pipe or branch metal fixture used in a fuel rail such as a high-pressure fuel manifold or high-pressure fuel block and, more particularly, to a connection structure for a branching connector used in a high-pressure fuel rail which supplies fuel under high pressure reaching 1000 kgf/cm$^2$ or more in a diesel internal combustion engine.

BACKGROUND ART

A conventional connection structure of this kind for a branching connector is shown in FIG. 7, where a main tube 11 acts as a fuel rail provided with a channel 11'. A hole 11" extends through the wall around the main tube 11, and is in communication with the channel 11' in the main tube. The hole 11" is of simple circular cross section. A branch tube 12 acting as a branching connector is inserted in the hole 11". The branch tube 12 has a connection end 12' which is neither enlarged nor shrunk. Under this condition, the connection end 12' is brazed at 13 to the main tube, thus forming a connection structure.

In this connection structure built by the prior art technique, fluid under high pressure amounting to 1000 kgf/cm$^2$ or more is constantly and repeatedly supplied. The pressure is rapidly changed. Vibrations are given especially from the engine. The ambient temperature is elevated and lowered, causing the relative dimensions of the opposite members (the opposite seat surfaces) to vary. Especially, where the diameter of the branching connector is small compared with the diameter of the main tube 11, when the main tube is brazed to the branching connector, local heating deteriorates the mechanical strength near the brazed portion 13. As the tubes get fatigued due to vibrations, cracks are easily produced. As a result, leakage of the fuel may occur frequently.

In view of the foregoing problems with the prior art technique, the present invention has been made. It is an object of the invention to provide a connection structure for a branching connector used in a high-pressure fuel rail, the connection structure having a connected portion in which two components are brazed together firmly. The connection structure is further characterized in that stress in the branching connector near the connected portion due to fatigue is effectively dispersed. If the connection structure is placed in position and repeatedly supplied with fluid under high pressure which varies rapidly, or if the relative dimensions are varied by the variations in the pressure of the supplied fluid, application of vibrations, or temperature variations, cracks are effectively prevented from being produced in the branching connector near the connected portion. This eliminates the possibility of leakage of the fuel.

DISCLOSURE OF THE INVENTION

In order to achieve the foregoing problem, the present invention provides a connection structure for a branching connector used in a high-pressure fuel rail having a main tube provided with a channel, the main tube being further provided with at least one hole extending vertically through the wall around the main tube and in communication with the channel. The at least one hole forms a dished seat portion having a staircase-like cross section or an inclined surface. The branching connector has an enlarged portion near its one end, the enlarged portion extending to an inclined wall toward the front end. This enlarged portion has a connection head portion near its front end. The connection head portion totally conforms in cross-sectional shape with the seat portion. The head portion is brought into abutting engagement with the seat portion. The mutually engaging portions are brazed together, thus forming the connection structure.

In one feature of the invention, the aforementioned connection head portion is formed by having the connection head portion or a sleeve fitted thereover. The connection head portion is formed integrally with one end of the branching connector. Alternatively, the outer surface of the connection head portion forms an enlarged portion extending to the inclined wall toward the front end. The diameter of the enlarged portion is about 1.1–1.5 times the diameter of the branch tube or branch metal fixture, the length of the inclined wall is 1–5 times the diameter, or the ratio of the length of the enlarged portion to the diameter is ¼ to 1.

Since the present invention is constructed in this way, the above-described seat portion formed by the fuel rail is totally brought into abutting engagement with the connection head portion of the enlarged portion extending to the inclined wall of the branching connector, and they are brazed and connected together. The total abutting engagement permitted by the cross-sectional shapes of the engaging portions increases the area of the brazed portions. Furthermore, the directions of the abutting surfaces increases the brazing strength at the junction. At the same time, fatigue stress in the branching connector near the junction is effectively dispersed by the enlarged portion and also by the inclined wall whose diameter varies gradually. Accordingly, if the connection structure is repeatedly supplied with fluid under high pressure which varies rapidly, or if the relative dimensions are varied by the variations in the pressure of the supplied fluid, application of vibrations, or ambient temperature variations, cracks are effectively prevented from being produced in the branching connector near the junction. This eliminates the possibility of leakage of the fuel. In addition, if the diameter of the branching connector is small compared with the diameter of the tube of the fuel rail, advantages can be obtained.

BEST MODE FOR CARRYING OUT THE INVENTION

Figure 1:
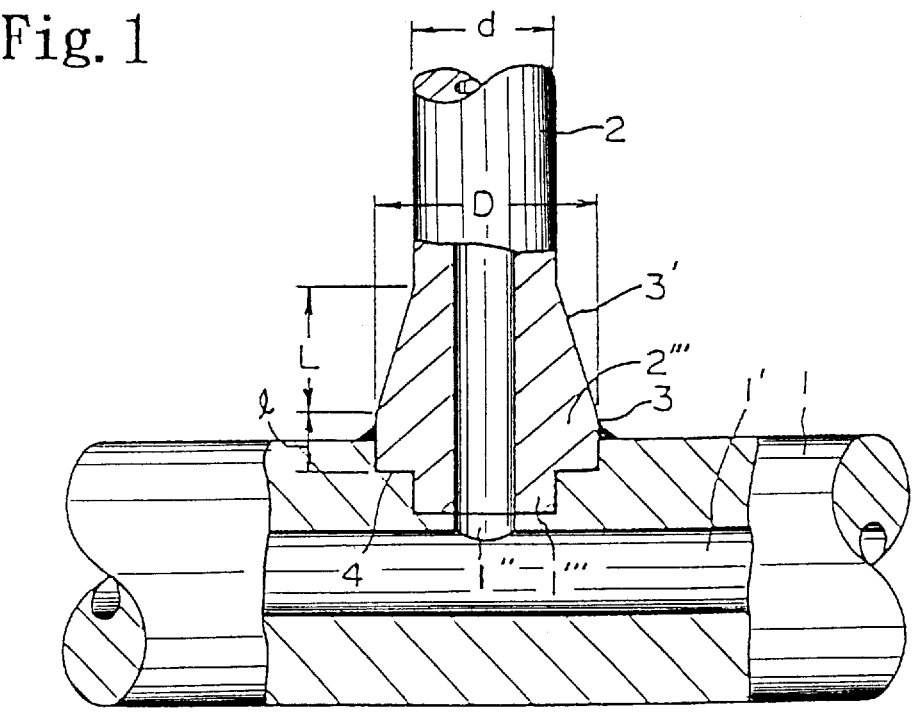
FIG. 1 is a partially cutaway cross section of a connection portion formed by a branch tube associated with a connection structure of a branch connector used in a high-pressure fuel rail according to the present invention.

Embodiments of the present invention are hereinafter described by referring to the drawings.

Figure 2:
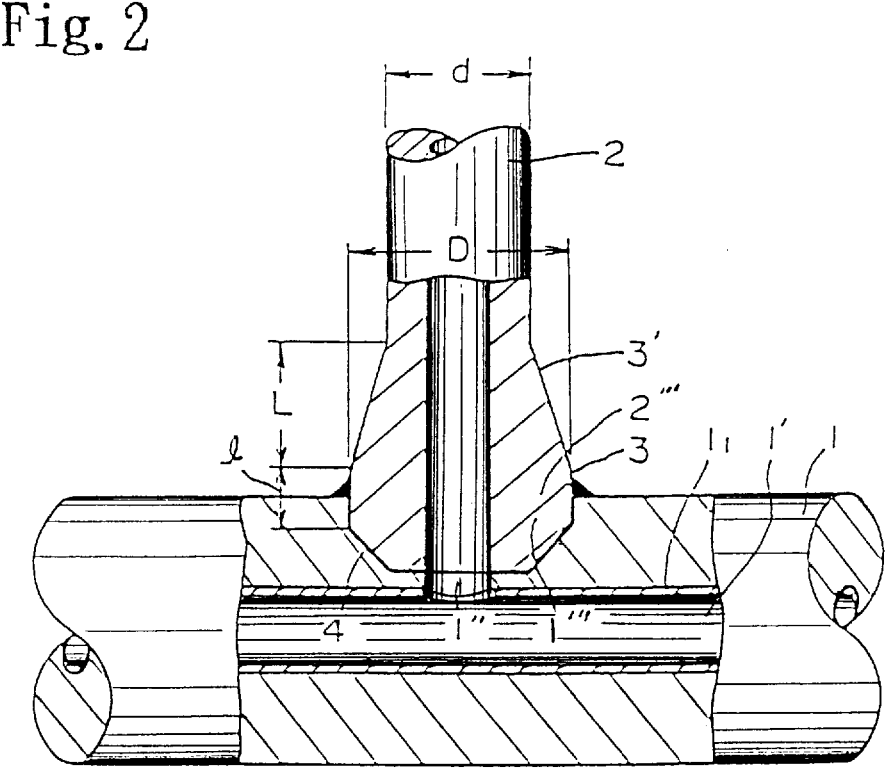
FIG. 2 is a view similar to FIG. 1, but showing another example.
Figure 3:
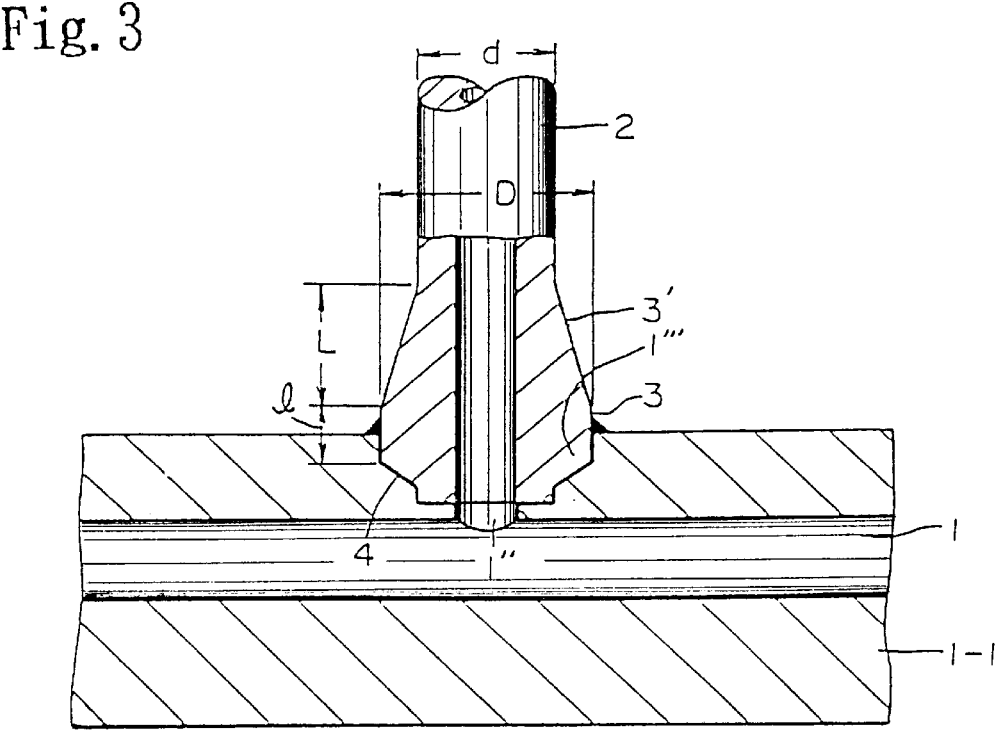
FIG. 3 is a view similar to FIG. 1, but showing a further example.
Figure 4:
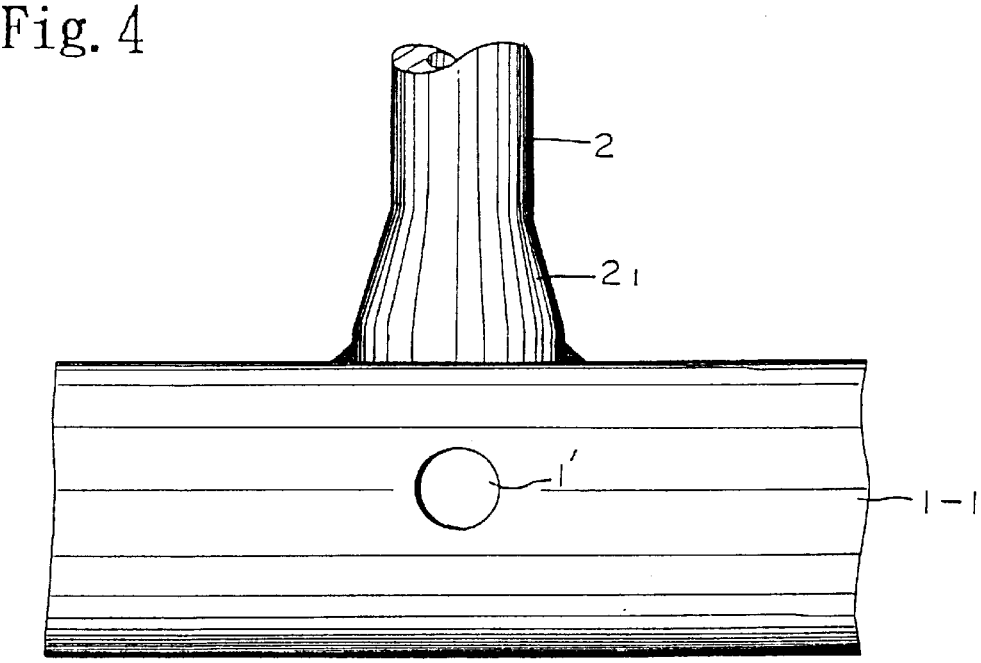
FIG. 4 is a front elevation of a branch connector formed by a branch metal fixture.
Figure 5:
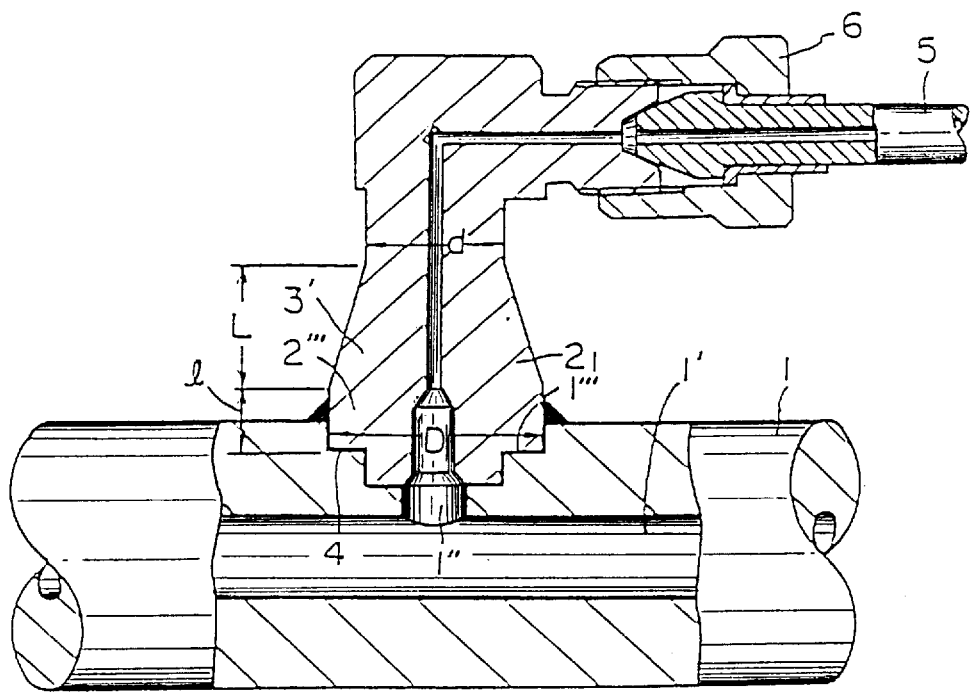
FIG. 5 is a partially cutaway cross-section of a connection portion formed by a branch metal fixture, showing a still other example.

In FIGS. 1–6, a main tube 1 serves as a fuel rail and is provided with a channel 1'. The main tube is a pressure piping made of carbon steel having a diameter of less than about 30 mm, a thick-walled steel tube consisting of stainless steel, or composite tubular member fabricated by fitting a corrosion-resistant inner tube 11 as made of stainless steel, as shown in FIG. 2. One or more holes 1' extend vertically through the wall of the main tube surrounding the channel, and are in communication with the channel. The holes 1' are axially spaced from each other. The cross-sectional shape of each hole 1' is shaped like a staircase to form a dished seat portion 1", as shown in FIG. 1 or 5, or each hole forms a dished seat portion 1" having an inclined surface, as shown in FIG. 2 or 3. The fuel rail may also be formed as a fuel block 1—1, as shown in FIG. 3.

Indicated by 2 is a branch tube (FIGS. 1, 2, and 3) acting as a branching connector. Similarly, a branch metal fixture $2_1$ (FIGS. 4 and 5) forms a branching connector constituting a further example. The diameters of the branch tube 2 and branch metal fixture $2_1$ are less than about 20 mm. These tube and fixture are made of the same kind of steel piping member or steel member as the main tube 1. One end of the branch tube 2 or branch metal fixture $2_1$ is so shaped that an enlarged portion 3 extending to an inclined wall 3' is formed. The diameter of the tubular enlarged portion 3 gradually increases toward the front end. A connection head portion 2" is formed integrally with the front end of the enlarged portion 3. The connection head portion 2" totally conforms in cross-sectional shape with the seat portion 1". The head portion is brought into abutting engagement with the seat portion 1". Under this condition, the abutting portions are brazed together at 4, thus forming a connection structure.

Where the branch metal fixture $2_1$ is used, a high-pressure fuel injection tube 5 is placed at the other end of the branch metal fixture by a nut 6.

Figure 6A:
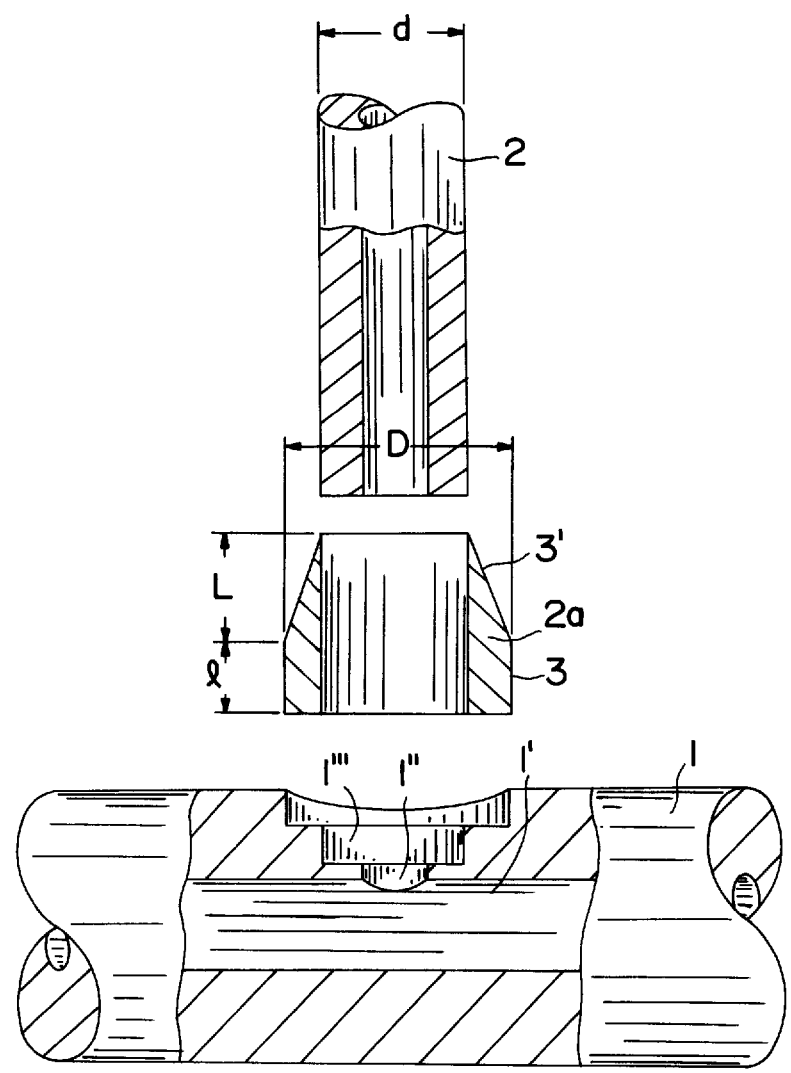
FIG. 6A and FIG. 6B are exploded, partially cutaway cross sections of yet other examples of the invention.
Figure 6B:
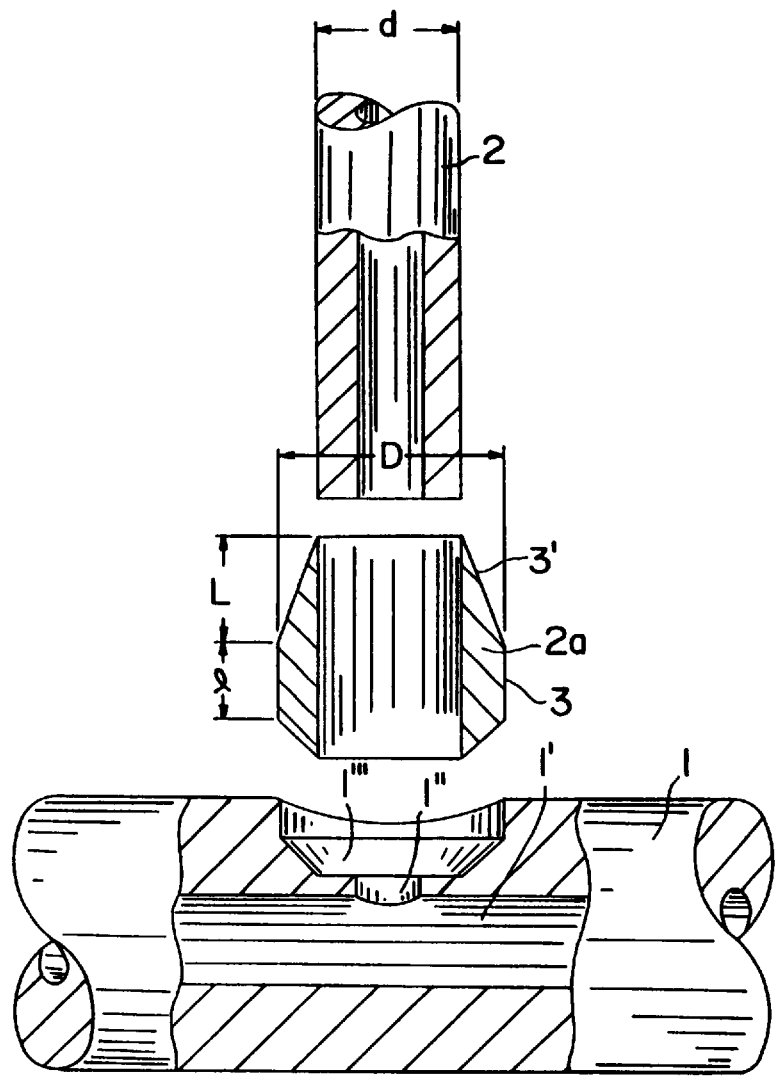
Figure 7:
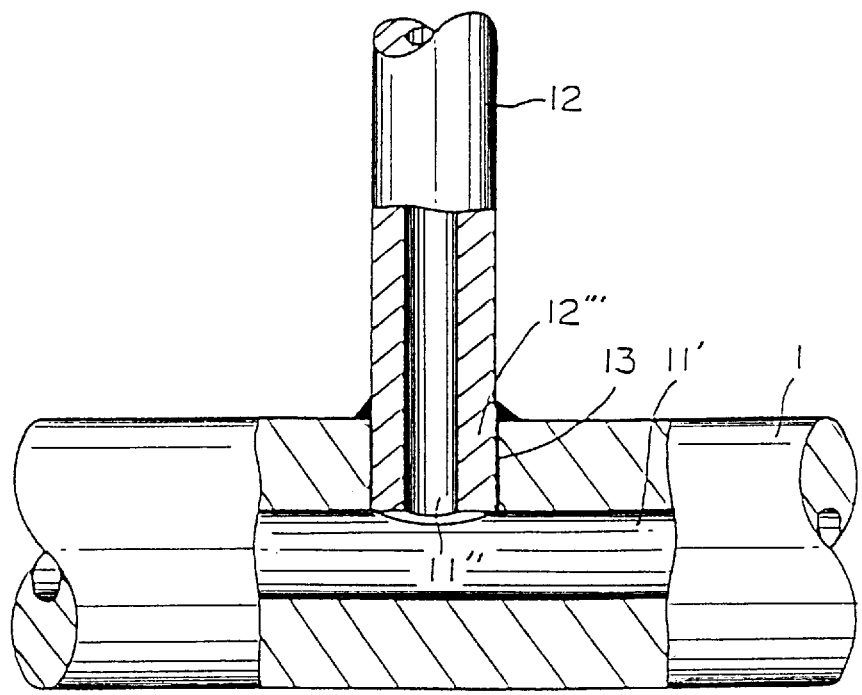
FIG. 7 is a partially cutaway cross section of a connection structure of a branching connector used in a conventional high-pressure fuel rail.

In the examples shown in FIGS. 1–5, one end of the branch connector 2 is shaped so as to have the integral connection head portion 2". The present invention is not limited to these examples. The invention can also be constructed as shown in FIGS. 6A and 6B.

Specifically, instead of forming the connection head portion 2" integrally with the end of the branch connector 2, a separate sleeve 2a having an enlarged portion 3 extending to an inclined wall 3' may be mounted on the outer surface of the branch connector 2. The diameter of the tubular enlarged portion 3 gradually increases. The sleeve 2 is at a distance corresponding to the depth of the dished seat portion 1" from the end of the branch connector 2 and fitted over the branch connector 2. The sleeve 2a and the branch connector 2 may be previously brazed together. Alternatively, when brazing to the seat portion 1" at 4 is done, they may be brazed together, thus forming a connection body.

In this structure, in the present invention, the diameter (D) of the enlarged portion 3 is preferably about 1.1–1.5 times the diameter (d) of the branch tube or branch metal fixture in connection with the relation of the diameter (D) of the enlarged portion 3 to the vibration-resistance, the easiness with which the enlarged portion is machined, the diameter of the main tube 1, and other factors. Where the factor is less than 1.1, the vibration-resistance is poor. On the other hand, where the factor exceeds 1.5, it is unreasonable or difficult to machine the enlarged portion. Furthermore, where the fuel rail is the main tube 1, the rigidity of the main tube deteriorates.

In connection with the fatigue stress-dispersing effect, the length (L) of the inclined wall 3' is preferably 1–5 times the diameter (d). If the length is less than the diameter, the dispersing effect is poor. On the other hand, where the ratio is in excess of 5, the dispersing function is almost hardly affected and meaningless.

Furthermore, in connection with the brazing strength, the easiness with which the enlarged portion is machined, and the fatigue stress-dispersing effect, the ratio of the length (l) of the enlarged wall 3 to the diameter (d) is preferably ¼ to 1. If the length is less than one quarter of the diameter, a fillet exhibiting good stress-dispersing capability is not well formed, or sufficient brazing strength is not obtained. If the length is in excess of the diameter, it is unreasonable or difficult to machine the enlarged portion. The inclined wall 3' may be formed by an outwardly directed, mild, arc-shaped surface according to the need.

INDUSTRIAL APPLICABILITY

As described thus far, a connection structure for a branching connector used in a high-pressure fuel rail according to the present invention has the sleeve (2a) fitting over the branching connector. The main tube (1) is mounted on the side of the fuel rail, or the holes (1') extend through the block (1—1). The branch tube (2) or branch metal fixture ($2_1$) forms the connection head portion (2") on the side of the branching connector in the hole 1'. The sleeve (2a) is similar in shape with the connection head portion. The sleeve is totally brought into abutting engagement with the dished seat portion (1") by the connection head portion (2"), and they are brazed together at 4. The total abutting engagement permitted by the cross-sectional shapes of the engaging portions increases the area of the brazed portions. Furthermore, the directions of the abutting surfaces increase the brazing strength at the junction. At the same time, fatigue stress in the branching connector near the connected portion of the branch tube (2) or of the branch metal fixture ($2_1$) can be effectively dispersed. Accordingly, if the connection structure is placed in position and repeatedly supplied with fluid under high pressure which varies rapidly, or if the relative dimensions are varied by the variations in the pressure of the supplied fluid, application of vibrations, or ambient temperature variations, cracks are effectively prevented from being produced in the branching connector near the connected portion. This eliminates the possibility of leakage of the fuel. In addition, if the diameter of the branching connector is small compared with the diameter of the tube of the fuel rail, advantages can be obtained. Moreover, during an overhaul, dust is prevented from intruding through the junction. In this way, the connection structure for the branching connector used in the high-pressure fuel rail is quite useful.

I claim:

1. A connection structure for a branching connector in a high-pressure fuel rail, said connection structure comprising:

a main tube having an elongate peripheral wall with a channel extending longitudinally therethrough;

at least one hole extending transversely of said main tube through said peripheral wall and in communication with said channel in said main tube;

a dished seat portion having a staircase-shaped cross section;

a branching connector having a front end and a small diameter generally tubular portion spaced from said front end, an outwardly inclined wall extending from said small diameter tubular portion toward said front end of said branching connector;

an enlarged portion extending from said inclined wall toward said front end of said branching connector; and a connection head portion formed around the front end of said branching connector, said connection head portion totally conforming in cross-sectional shape with said seat portion, said head portion being brought into abutting engagement with said seat portion, engaging portions of said head portion and said seat portion which abut against each other being brazed and connected together.

2. A connection structure for a branching connector in a high-pressure fuel rail as set forth in claim 1, wherein said branching connector has a sleeve fitted over said small diameter tubular portion, said sleeve having an outer surface forming the enlarged portion and the inclined wall.

3. A connection structure for a branching connector in a high-pressure fuel rail as set forth in claim 2, wherein said enlarged portion has a diameter (D) which is approximately 1.1–1.5 times as large as a diameter (d) of the small diameter generally tubular portion.

4. A connection structure for a branching connector in a high-pressure fuel rail as set forth in claim 2, wherein said inclined wall has a length (L) which is 1–5 times as large as a diameter (d) of said small diameter generally tubular portion.

5. A connection structure for a branching connector in a high-pressure fuel rail as set forth in claim 2, wherein said enlarged portion has a length of l and a diameter of D, and wherein the ratio of said length (l) of said enlarged portion to the diameter D of the enlarged portion is ¼ to 1.

6. A connection structure for a branching connector in a high-pressure fuel rail as set forth in claim 1, wherein said enlarged portion has a diameter (D) which is approximately 1.1–1.5 times as large as a diameter (d) of the small diameter generally tubular portion.

7. A connection structure for a branching connector in a high-pressure fuel rail as set forth in claim 1, wherein said inclined wall has a length (L) which is 1–5 times as large as a diameter (d) of said small diameter generally tubular portion.

8. A connection structure for a branching connector in a high-pressure fuel rail as set forth in claim 1, wherein said enlarged portion has a length of l and a diameter of D, and wherein the ratio of said length (l) of said enlarged portion to the diameter D of the enlarged portion is ¼ to 1.

9. A connection structure for a branching connector in a high-pressure fuel rail, said connection structure comprising:

a main tube having an elongate peripheral wall with a channel extending longitudinally therethrough;

at least one hole extending transversely of said main tube through said peripheral wall and in communication with said channel in said main tube;

a dished seat portion having an inclined surface;

a branching connector having a front end and a small diameter generally tubular portion spaced from said front end, an outwardly inclined wall extending from said small diameter tubular portion toward said front end of said branching connector;

an enlarged portion extending from said inclined wall toward said front end of said branching connector; and a connection head portion formed around the front end of said branching connector, said connection head portion totally conforming in cross-sectional shape with said seat portion, said head portion being brought into abutting engagement with said seat portion, engaging portions of said head portion and said seat portion which abut against each other being brazed and connected together.

10. A connection structure for a branching connector in a high-pressure fuel rail as set forth in claim 9, wherein said branching connector has a sleeve fitted over said small diameter tubular portion, said sleeve having an outer surface forming the enlarged portion and the inclined wall.

11. A connection structure for a branching connector in a high-pressure fuel rail as set forth in claim 10, wherein said enlarged portion has a diameter (D) which is approximately 1.1–1.5 times as large as a diameter (d) of the small diameter generally tubular portion.

12. A connection structure for a branching connector in a high-pressure fuel rail as set forth in claim 10, wherein said inclined wall has a length (L) which is 1–5 times as large as a diameter (d) of said small diameter generally tubular portion.

13. A connection structure for a branching connector in a high-pressure fuel rail as set forth in claim 10, wherein said enlarged portion has a length of l and a diameter of D, and wherein the ratio of said length (l) of said enlarged portion to the diameter D of the enlarged portion is ¼ to 1.

14. A connection structure for a branching connector in a high-pressure fuel rail as set forth in claim 9, wherein said enlarged portion has a diameter (D) which is approximately 1.1–1.5 times as large as a diameter (d) of the small diameter generally tubular portion.

15. A connection structure for a branching connector in a high-pressure fuel rail as set forth in claim 9, wherein said inclined wall has a length (L) which is 1–5 times as large as a diameter (d) of said small diameter generally tubular portion.

16. A connection structure for a branching connector in a high-pressure fuel rail as set forth in claim 9, wherein said enlarged portion has a length of l and a diameter of D, and wherein the ratio of said length (l) of said enlarge portion to the diameter D of the enlarge portion is ¼ to 1.

* * * * *